H. V. LECKIE.
POSITIVE FRICTION CLUTCH.
APPLICATION FILED MAY 15, 1916.

1,241,129.

Patented Sept. 25, 1917.
3 SHEETS—SHEET 1.

Witnesses

Inventor
Herbert V. Leckie
By Chamberlain & Newman
Attorneys

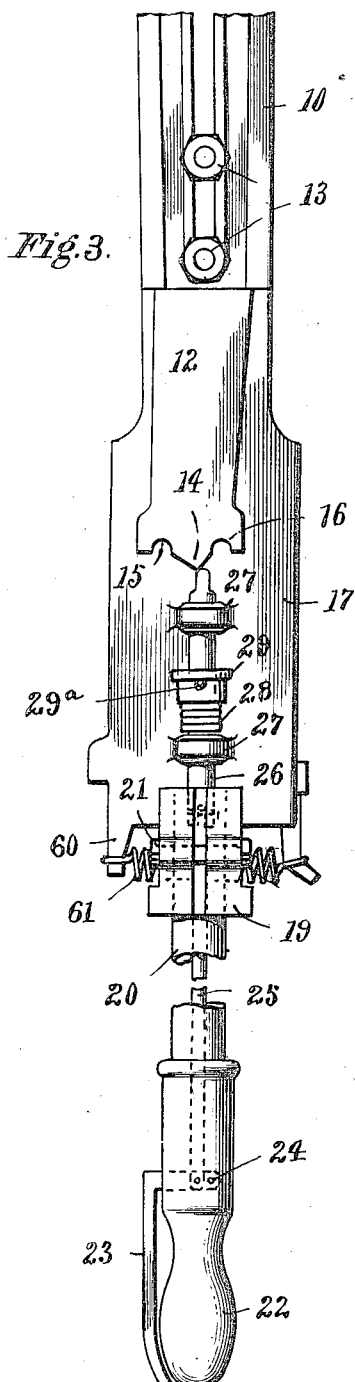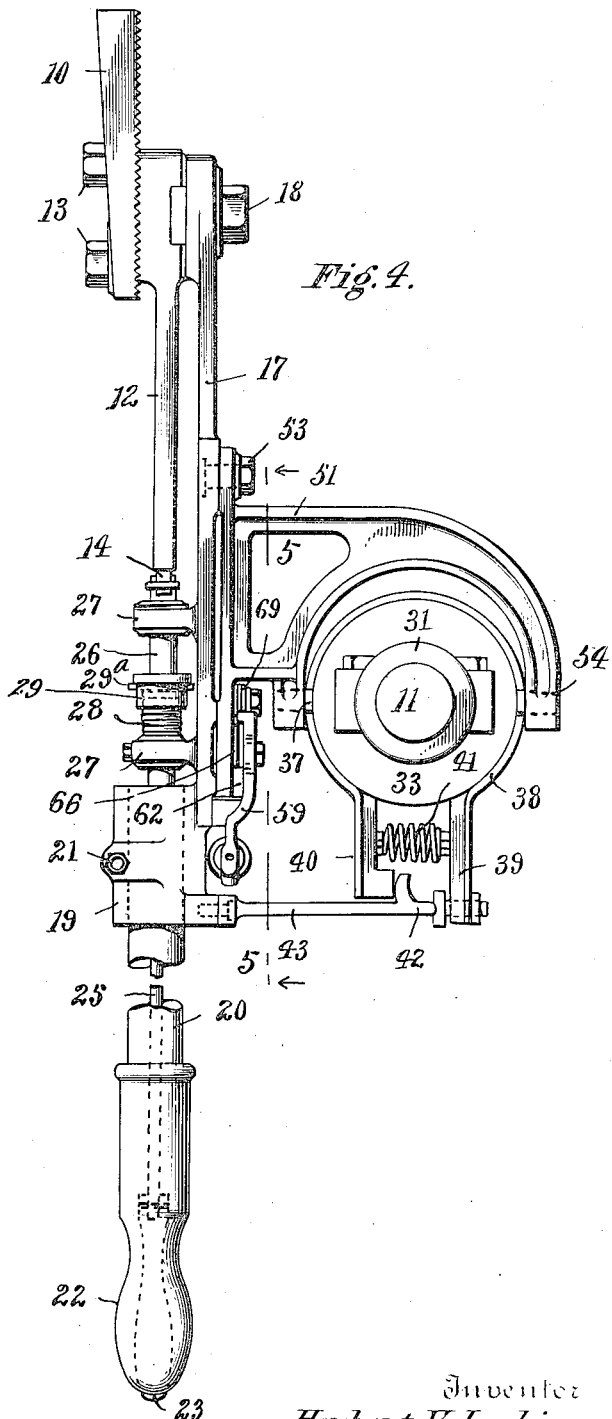

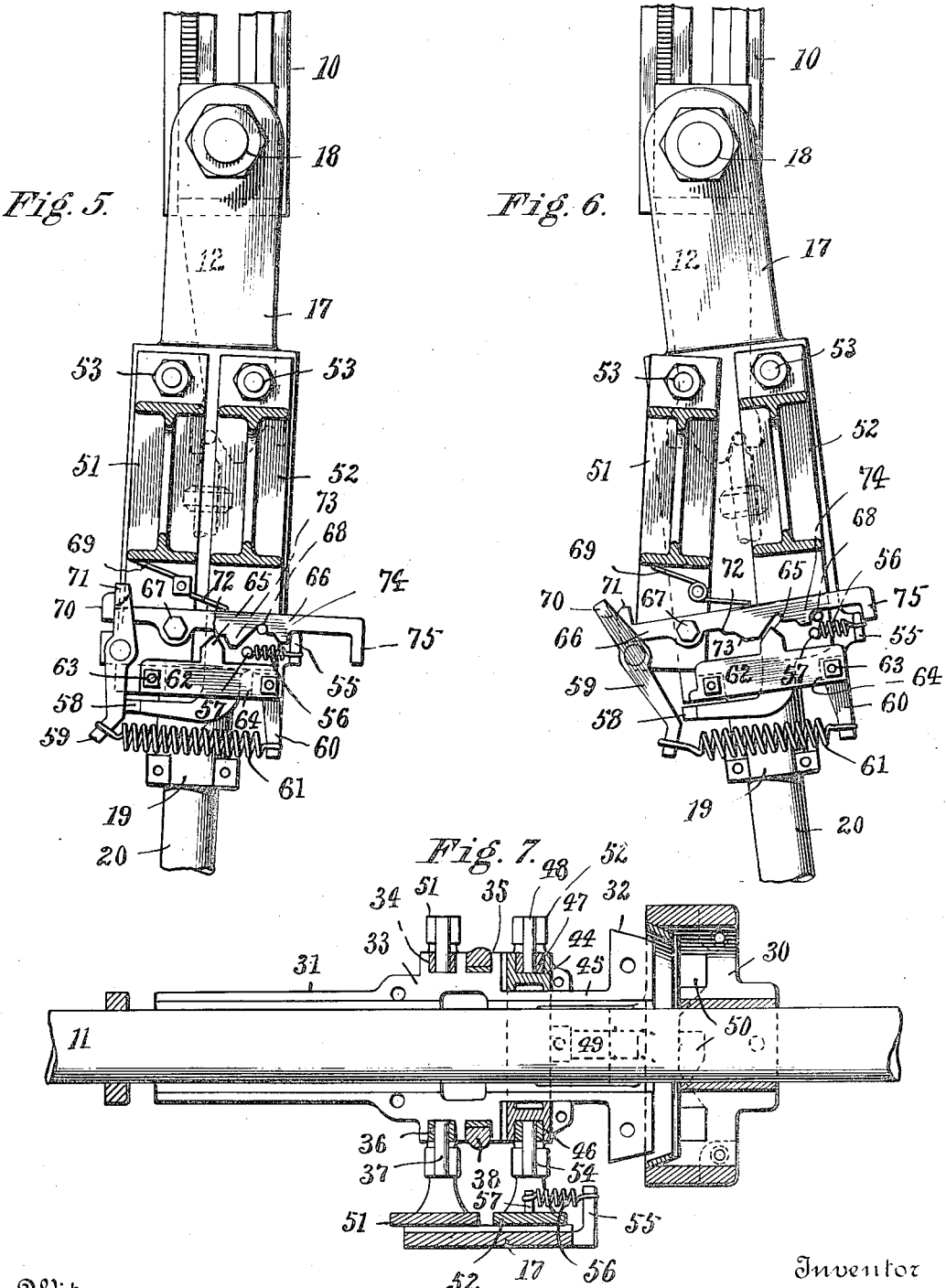

UNITED STATES PATENT OFFICE.

HERBERT V. LECKIE, OF BRIDGEPORT, CONNECTICUT.

POSITIVE FRICTION-CLUTCH.

1,241,129.  Specification of Letters Patent.  Patented Sept. 25, 1917.

Application filed May 15, 1916. Serial No. 97,456.

*To all whom it may concern:*

Be it known that I, HERBERT V. LECKIE, a citizen of the United States, and resident of Bridgeport, in the county of Fairfield and State of Connecticut, have invented certain new and useful Improvements in Positive Friction-Clutches, of which the following is a specification.

This invention relates to clutches such as are used upon line shafting to transmit power to a machine that is driven therefrom.

It is the object of the invention to produce a new form of clutch which will afford a preliminary friction engagement an intermediate pause and a final or ultimate positive engagement thus insuring a smooth, yet positive driving connection between the driving and driven members. A further feature of the device is to provide a locking device that will hold the clutch in both an engaged and disengaged position so as to prevent the accidental engagement or disengagement of the clutch members; further to provide a brake that is automatically operated with the movement of the clutch members so as to promptly stop the driven members when not engaged.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Figure 1 shows a front view of the clutch and operating mechanism complete.

Fig. 3 is a rear view of the lever mechanism for operating the clutch, the handle portion being broken away.

Fig. 4 is a side view as seen from the right of Fig. 1.

Fig. 5 is a front sectional elevation taken on line 5—5 of Fig. 4 the lever being in a disengaged position.

Fig. 6 is a similar sectional elevation of the lever operating mechanism, but in a position for engaging the clutch not shown, and Fig. 7 shows a longitudinal sectional plan view of clutch and operating mechanism therefor, taken on line 7—7 of Fig. 1.

Figure 1:
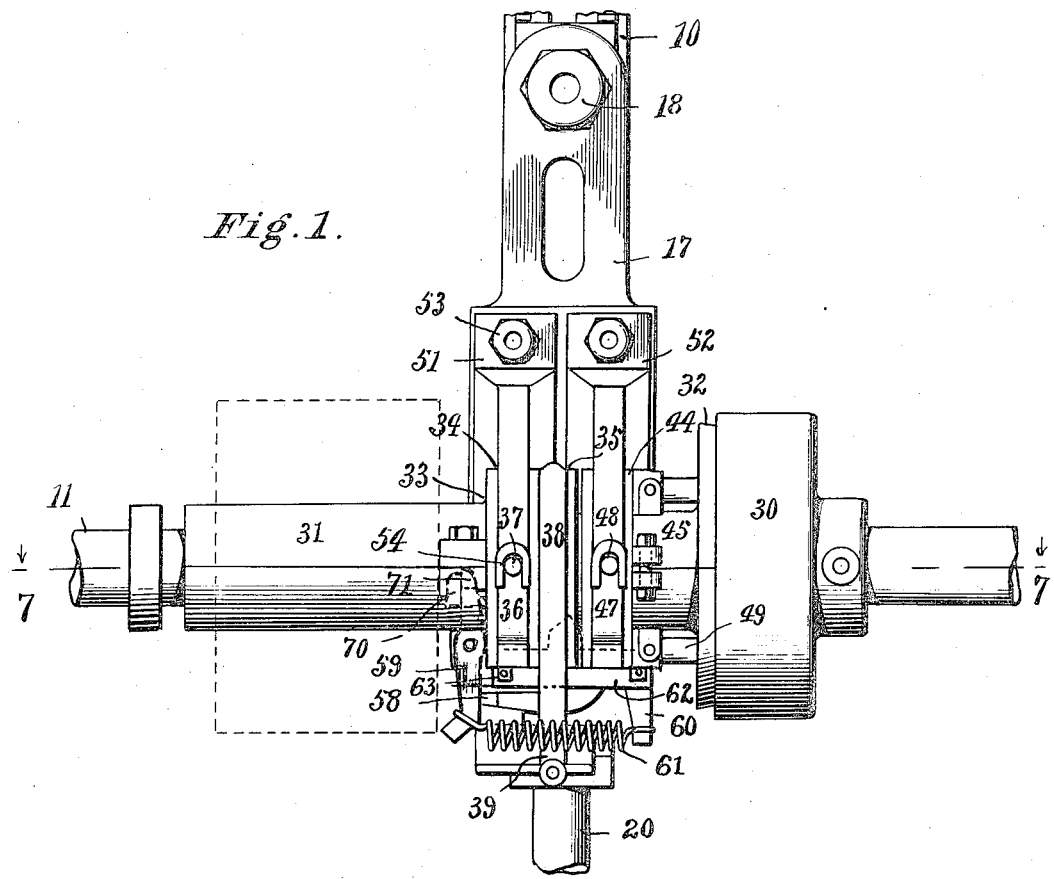

Referring to the characters of reference marked upon the drawings 10 indicates the lower portion of a hanger which in practice would be suspended from the ceiling by which the line shafting 11 would probably also be supported. 12 represents an arm which is adjustably secured to the hanger by means of screw bolts 13. The lower end of this arm is provided with a central arrow point 14 and sockets on either side of the arrow designated as 15 and 16 respectively.

A shipper arm 17 is pivotally connected to the upper end of the arm through the medium of a screw bolt 18 and is thus adapted to be swung backward and forward upon a pivot.

The lower end of the shipper lever is provided with a socket 19 in which a pipe extension 20 is clamped through the medium of a screw bolt 21. A handle 22 is secured to the lower end of the pipe extension and in it is pivotally connected a finger lever 23 that is pivoted in the handle at 24. A link 25 connects the finger lever with a spring actuated detent 26 which is slidably mounted in bearings 27 secured to the back of the shipper lever.

A heavy spring 28 which acts upon a pin 29ª secured to the detent serves to normally hold the detent in engagement with the under edge portion of the fixed arm 12 so as to normally hold the clutch in an engaged or disengaged position. When it is desired to shift the lever and clutch the operator first operates the finger lever 23 against the action of the spring 28 whose action is limited by fixed collar 29 to a movement of a distance sufficient to withdraw it from the sockets 15 or 16, the object of the spring obviously being to hold the plunger up against the arm and thereby retain the shipper lever in either of its engaged positions.

Figure 2:
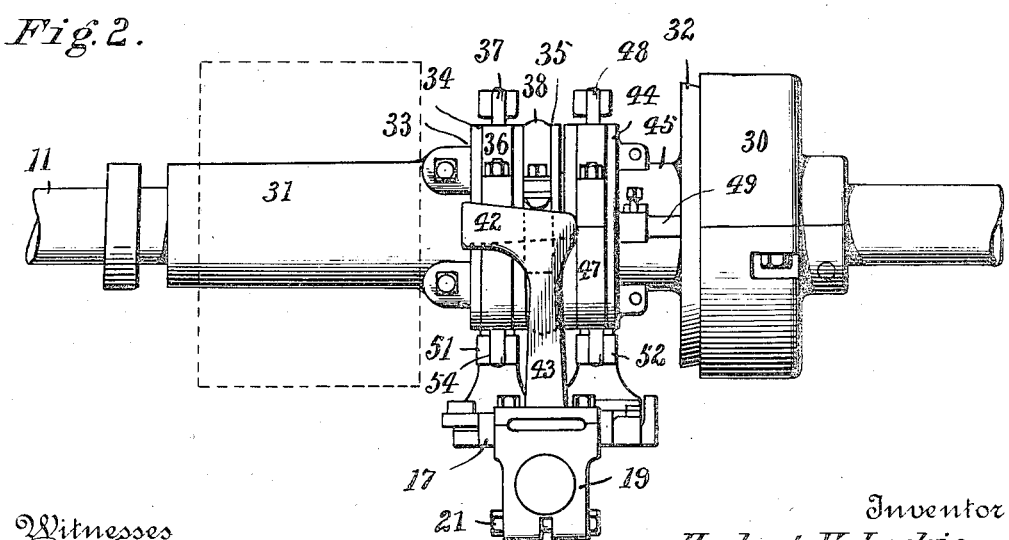
Fig. 2 is a bottom view of Fig. 1.

Referring to Fig. 7,—30 represents a female clutch member which is secured to the line shaft 11 and 31 represents the sleeve of a male clutch member 32 which is slidable on shaft 11 and on which may be mounted a driving pulley as indicated by dotted lines. The hub portion 33 of the sleeve is provided with two annular grooves 34 and 35 the former of which serves to accommodate a band 36 carrying pins 37 on the opposite sides. The other groove 35 is to accommodate a brake band 38 that extends around the hub and has its two end portions 39 and 40 disposed downward substantially parallel to each other (see Fig. 4). A spring 41 is connected to and between these arms and acts to draw the band together and around the sleeve to brake the same when not held apart by the cam 42 formed on the arm 43 secured to the socket 19 of the shipper lever. This cam and arm is best seen in Figs. 2 and 4 and as will be noted is in a sense in the form of a wedge that is adapted to be moved forward in between the arms of the brake band in a way to separate the same and backward to release the arms, permitting the spring to act and draw the band together as would be required. It, of course, follows that this device serves to apply the brake when the shipper arm is thrown to the left as indicated in Fig. 5 and when the clutch is released it acts to release the clutch when the shipper arm is thrown forward to engage the driving with the driven member of the clutch.

A slidable ring 44 is mounted upon the forward reduced end portion 45 of the sleeve 31 and like the hub of the latter sleeve is provided with an annular groove 46 in which a second band 47 is mounted and which also serves to carry pins 48 upon the opposite sides for the engagement of operating arms pivoted to the shipper arm. To this ring is attached a pair of lock pins 49 that are slidably mounted in the before mentioned clutch member 32, and at the proper time, after the friction clutch member is engaged, are shoved forward to engage the notches 50 in the clutch member 30, so as to form a positive engagement between the driving and driven members. 51 and 52 indicates the operating arms, the upper end portions of which are pivoted to the shipper lever at 53. The arm 51 serves to operate the friction member of the clutch, while the arm 52 serves to operate the positive or pin member of the clutch. Each of these arms are provided with forked extensions that encircle the upper portion of the sleeve and include oppositely located sockets 54 to receive the pins 37 and 48 before mentioned to form an operative connection between the operating arms and the clutch members.

A lug 55 is formed upon one side of the shipper arm and to it is attached one end of a small spring 56 and whose other end is connected to a pin 57 secured in the lower end of the operating arm 52 and which serves to pull the said operating arm and therefore the pin collar in a forward position as indicated in Fig. 5. An extension 58 is formed upon the lower end of the arm 52 (see Fig. 5) which is disposed down and outward in the line of the pawl 59 pivoted on the second arm 51. A finger 60 extends down from the shipper arm 17 for the attachment thereto of one end of a spring 61 and whose other end is attached to the lower end of the locking pawl 59 pivoted to the arm 51. A plate 62 is also secured to the lower end portion of the shipper arm 17, being secured by screws 63, and extends across the before mentioned extension 58 so as to leave it free to move backward and forward thereunder to and from the shoulder 64. An upwardly disposed arrow point 65 is formed on the upper edge portion of this plate 62 in the path of movement of a trip lever 66. This trip lever is pivoted to the operating arm 51 at 67 and is normally held down against the pin 68, as shown in Fig. 5, by a spring 69 carried by the operating arm 51. The short end of this trip lever is provided with an upturned end forming a hook 70 that is engaged by a lug 71 upon the upper end of the pawl 59 the purpose being to hold the pawl in position shown in Fig. 5 in such a manner as to form a rigid connection for a time, between the arm 51 and the shipper lever 17. The trip lever includes a cam shaped edge that engages and operates against the arrow point 65 in the operation of the clutch and which engagement serves to trip the lever 66 to permit the operating arm 52 to separate from arm 51 so that the pin collar 44 may be pulled forward rapidly by means of spring 56 thus engaging the pins when the clutch members are shoved into final position.

The operation therefore of the device with the parts in the position shown in Figs. 1 and 5 is as follows: The operator first engages the handle 22, and manipulates the finger lever 23 to disengage the spring detent 26 from the notch 16 against the action of spring 28 so as to free the shipper arm from its locked open position. A forward movement to the right of the shipper arm carries all the parts as shown in Fig. 5 forward, gradually shoving the friction clutch 32 into engagement.

As the detent passes the arrow point 14 it further compresses the spring 18 and if shipper lever be released the handle will move forward by the action of the spring detent which becomes seated in the socket 16. The initial forward movement of the shipper lever which is connected through the arm 51 with the friction clutch serves to move the said clutch member 32 forward into engagement with the fixed clutch member 30. When the friction clutch member 32 is thus engaged the arms 51 and 52 come to a stop while the shipper lever continues forward slightly carrying with it the attached member 62 bearing the arrow point 65 which raises the trip lever sufficient to disengage the pin 68 and allow the arm 52 to move forward through the connection of the spring 56 with the shipper lever. This causes the engagement of the pin 49 with the sockets of the fixed clutch member forming the positive or locking engagement of the clutch members. The continuous forward movement of the shipper lever causes the arrow point 65 to next engage the incline 73 forcing up the long end of the trip lever, thereby causing the spring actuated pawl 59 to relieve the end thrust caused by said spring upon the line shaft 11 and which thrust would obviously be to the right as seen in Fig. 7.

The detent has, of course, been brought forward so that it will engage the notch 16 and lock the clutch in its engaged position. The pin 68 in the mean time is also moved forward from a third incline 74 on lever 66 and lug 55 is moved to a position near shoulder 75 of lever 66, see Fig. 6, lug 55 being rigidly connected to lever 17 and pin 68 being attached to arm 52, a positive lock is formed between lug 55 and shoulder 75, thus preventing pins 49 from becoming disengaged from notches 50 of member 30.

In disengaging the clutch the operation of the hand lever is of course, reversed. The detent has to be first disengaged and then the lever thrown back. This, of course, means that the operating arm 52 connected with the sleeve carrying the pins is the first one to be affected. As the lever 17 moves backward it raises trip lever 66 and lug 64 on shipper lever 17 comes in contact with extension 58 thus unyieldingly shoving pins from engagements with sockets through operating arm 52. As arm 52 is shoved back the end of the extension 58 engages the pawl 52 in a way to throw it into an upright position permitting the hooks 70 and 71 to again become engaged. The shipper lever is then thrown to a position so that detent 26 is engaged with socket 15 and clutch members have then taken a disengaged locked position as shown in Fig. 5.

Having thus described my invention what I claim and desire to secure by Letters Patent is:—

1. In a clutch of the class described, the combination with a shaft, of a driving clutch member secured thereon having an annular friction face and sockets to receive lock pins, a second clutch member slidable upon the shaft and having an annular surface to engage the driving clutch member, a sleeve upon the movable clutch member, pins carried by the sleeve on the movable clutch member to engage the sockets of the fixed clutch member, a shipper lever, operating arms pivotally connected to the shipper lever, one of said arms being operatively connected to the friction clutch and the other of said arms connected with the sleeve carrying the pins to engage the fixed clutch member, a trip lever pivoted to one of the arms to detachably engage the other arm and a pin carried by the last named arm to disengage the said lever.

2. In a clutch of the class described, the combination with a shaft, of a driving clutch member secured thereon having an annular friction face and sockets to receive lock pins, a second clutch member slidable upon the shaft and having an annular surface to engage the driving clutch member, a sleeve upon the movable clutch member, pins carried by the sleeve on the movable clutch member to engage the sockets of the fixed clutch member, a shipper lever, operating arms pivotally connected to the shipper lever, one of said arms being operatively connected to the friction clutch and the other of said arms connected with the sleeve carrying the pins to engage the fixed clutch member, means for locking the said arms together when the clutches are disengaged, and mechanism for automatically releasing said lock when the friction clutch becomes engaged.

3. In a clutch of the class described, the combination with a shaft, of a driving clutch member secured thereon having an annular friction face and sockets to receive lock pins, a second clutch member slidable upon the shaft and having an annular surface to engage the driving clutch member, a sleeve upon the movable clutch member, pins carried by the sleeve on the movable clutch member to engage the sockets of the fixed clutch member, a shipper lever, operating arms pivotally connected to the shipper lever, one of said arms being operatively connected to the friction clutch and the other of said arms connected with the sleeve carrying the pins to engage the fixed clutch member, a lever, pawl and spring for releasably connecting the two said arms, and means for locking the shipper to hold the clutch in both an open and closed position.

4. In a clutch of the class described, the combination with a shaft, of a driving clutch member secured thereon having an annular friction face and sockets to receive lock pins, a second clutch member slidable upon the shaft and having an annular surface to engage the driving clutch member, a sleeve upon the movable clutch member, pins carried by the sleeve on the movable clutch member to engage the sockets of the fixed clutch member, a shipper lever, operating arms pivotally connected to the shipper lever, one of said arms being operatively connected to the friction clutch and the other of said arms connected with the sleeve carrying the pins, a spring actuated trip lever to insure the two said arms moving together with the shipper lever for a time to engage the frictions, and mechanism for releasing the lever to free one of said arms after its friction has been engaged.

5. In a clutch of the class described, the combination with a shaft, of a driving clutch member secured thereon a second clutch member slidable upon the shaft and having means to engage the driving clutch member, a sleeve upon the movable clutch member, pins carried by the sleeve on the movable clutch member to further engage the fixed clutch member, a shipper lever, operating arms pivotally connected to the shipper lever, one of said arms being operatively connected to the friction clutch and the other of said arms connected with the sleeve carrying the pins, a trip lever pivoted to one of the said operating arms and adapted to engage the other to hold them with relation to each other and automatic means carried by the shipper lever to release said lever and arms.

6. In a clutch of the class described, the combination with a shaft, of a driving clutch member secured thereon, a fixed arm including sockets, a second clutch member slidable upon the shaft and having means to engage the driving clutch member, a sleeve upon the movable clutch member, pins carried by the sleeve to engage the fixed clutch member, a shipper lever, a detent carried thereby to engage the sockets of the fixed arm to hold the clutch in open and closed positions, two operating arms pivotally connected to the shipper lever, means for connecting one of said arms to the friction clutch and means for connecting the other one of said arms with the sleeve carrying the pins to engage the fixed clutch member, mechanism for normally holding the two operating arms in engagement, and means for automatically releasing said hold when the slidable clutch member is engaged.

7. In a clutch of the class described, the combination with a shaft, of a driving clutch member secured thereon a second clutch member slidable upon the shaft and having means to engage the driving clutch member, a sleeve upon the movable clutch member, pins carried by the sleeve to further engage the fixed clutch member, a shipper lever, operating arms pivotally connected to the shipper lever, one of said arms being operatively connected to the friction clutch and the other of said arms connected to the sleeve carrying the pins, a trip lever for locking the arms together, means carried by the shipper lever for operating the tripping device, and means carried by one of said arms for operating the trip lever to lock the arms together.

8. In a clutch of the class described, the combination with a shaft, of a driving clutch member secured thereon, a second clutch member slidable upon the shaft and having means to engage the driving clutch member, a sleeve upon the movable clutch member, pins carried by the sleeve on the movable clutch member to further engage the fixed clutch member, a shipper lever, means connected with the shipper lever for operating the slidable clutch member, separate means carried by the shipper lever for operating the sleeve and pins, mechanism for locking the two said operating means together and automatic means for releasing said locking device to insure the engagement of the pins carried by the movable clutch member.

Signed at Bridgeport in the county of Fairfield and State of Connecticut this 6th day of May A. D., 1916.

HERBERT V. LECKIE.

Witnesses:
C. M. NEWMAN,
RUTH M. W. KOGER.